United States Patent [19]

Large

[11] Patent Number: 4,749,247
[45] Date of Patent: Jun. 7, 1988

[54] SELF-MONITORING FIBER OPTIC LINK

[75] Inventor: Scott F. Large, Salem, Va.

[73] Assignee: The MITRE Corporation, Bedford, Mass.

[21] Appl. No.: 847,703

[22] Filed: Apr. 3, 1986

[51] Int. Cl.$^4$ .......................... G02B 6/28; H04B 9/00; G01N 21/00; G02F 1/00

[52] U.S. Cl. ............................... 350/96.16; 350/96.15; 350/96.29; 455/610; 370/2; 356/73.1

[58] Field of Search ............... 350/96.15, 96.16, 96.18, 350/96.19, 96.20, 96.29; 370/1, 3, 2; 455/612, 610; 356/73.1, 237

[56] References Cited

U.S. PATENT DOCUMENTS

| | | | |
|---|---|---|---|
| 4,468,765 | 8/1984 | Hensel et al. | 370/1 |
| 4,522,462 | 6/1985 | Large et al. | 350/96.19 |
| 4,571,024 | 2/1986 | Husbands | 350/96.16 X |

Primary Examiner—William L. Sikes
Assistant Examiner—Akm E. Ullah
Attorney, Agent, or Firm—Wolf, Greenfield & Sacks

[57] ABSTRACT

The self-monitoring link utilizes a GRIN lens/blazed grating combination to multiplex an optical time domain reflectometry (OTDR) signal with data signals on a fiber optic communication link. An initial average OTDR reference signature for the OTDR signal on the link is determined and is compared with a continuously determined average OTDR signature. The reference signature and the continuously determined signature are compared and a warning or alarm signal is generated when the continuously determined signature differs from the reference signature by a preselectable limit. A microprocessor is provided to adjust the preselectable limit in response to the communication link operational parameters.

6 Claims, 2 Drawing Sheets

SELF-MONITORING FIBER OPTIC LINK

BACKGROUND OF THE INVENTION

This invention relates to a fiber optic communications system, and more particularly, to apparatus for monitoring the fiber optic link.

Over the past few years, a great deal of effort has been directed toward the development of a suitably reliable method for monitoring optical fiber communications. Although many of these techniques have shown promise, they are subject to limitations. Some of these limitations are complex fiber optic transceiver design, high cost fiber/cable designs, and only moderate link lengths.

It is therefore an object of the present invention to provide a continuously monitored communications link in a point-to-point configuration.

It is a further object of the present invention to provide such apparatus which does not require any special transmitter or receiver configurations and conventional fiber and cable designs may be employed.

It is yet another object of the present invention not only to detect cable plant faults, but also, to identify the severity as well as the location of a perturbation.

Yet another object of the invention is fiber optic link monitoring in which system operational parameter changes are accommodated.

SUMMARY OF THE INVENTION

The apparatus for continuously monitoring a fiber optic communication link according to the present invention comprises apparatus for multiplexing an optical time domain reflectometry (OTDR) signal with at least one data signal on a fiber optic link. An initial average OTDR reference signature for the OTDR signal on the link is determined and thereafter an average OTDR signature is continuously determined. The reference signature is compared with the continuously determined signature and a warning or alarm signal is generated when the continuously determined signature differs from the reference signature by a preselectable limit. A microprocessor controls the overall system and adjusts the preselectable limit in response to the communication link operational parameters and environmental conditions such as temperature.

BRIEF DESCRIPTION OF THE DRAWING

The invention disclosed herein will be understood better with reference to the drawing of which.

DESCRIPTION OF THE PREFERRED EMBODIMENT

Figure 1:
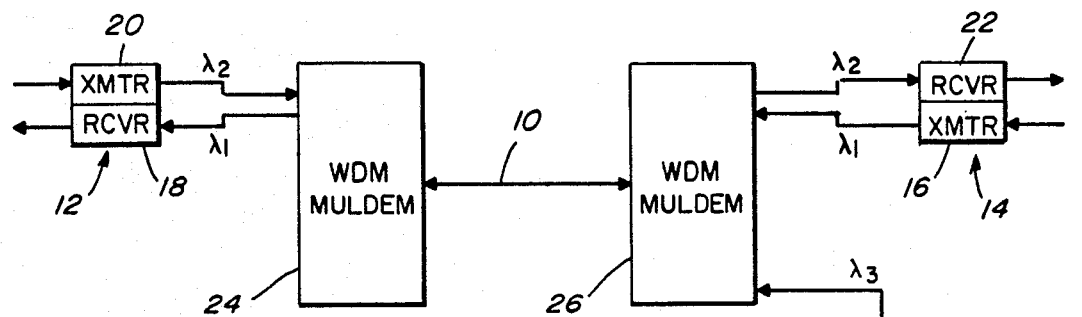
FIG. 1 is a schematic diagram of the total system configuration of the invention disclosed herein.

The present invention will now be described first in conjunction with FIG. 1. An optical fiber link 10 connects terminals 12 and 14 for data communication. A transmitter 16 transmits information at a first wavelength $\lambda_1$ and is received by a receiver 18. Similarly, a second transmitter 20 transmits at a wavelength $\lambda_2$ and is received by a receiver 22. The signals at frequencies $\lambda_1$ and $\lambda_2$ are multiplexed and demultiplexed by means of the multiplexer/demultiplexers (muldem) 24 and 26.

Figure 2:
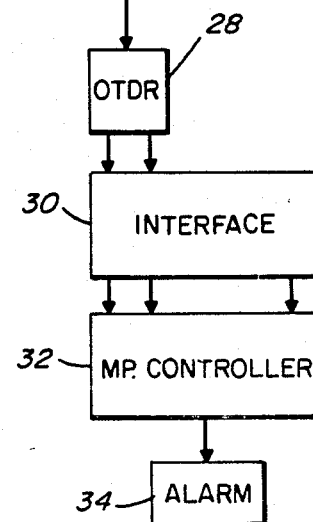
FIG. 2 is a schematic diagram of a GRIN lens/blazed grating multiplexer.
Figure 2:
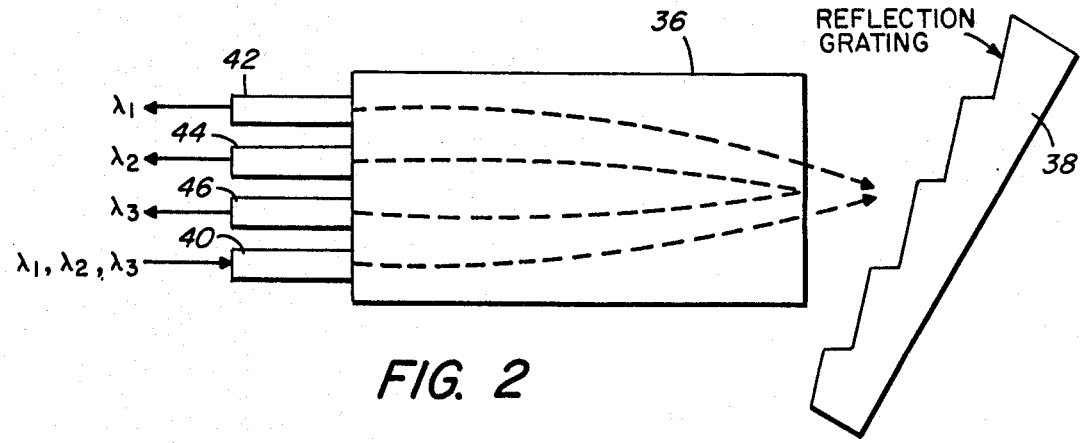

As will be discussed below, it is preferred that the multiplexer/demultiplexers 24 and 26 be GRIN lens/blazed grating combinations as shown in FIG. 2. An optical time domain reflectometry (OTDR) device 28 generates pulses at a wavelength $\lambda_3$ which are multiplexed with the data signals at wavelengths $\lambda_1$ and $\lambda_2$ by the multiplexer/demultiplexer 26. The return signals enter an interface unit 30 and pass to a microprocessor based controller 32 which activates an alarm 34 under appropriate circumstances as will be described below.

As shown in FIG. 2, a preferred multiplexer/demultiplexer includes a GRIN (gradient index of refraction) lens 36 and a blazed reflection grating 38. Such a multiplexer/demultiplexer is described in U.S. Pat. No. 4,522,462 issued June 11, 1985 and the teachings of this patent are incorporated herein by reference. As shown in the figure, three wavelengths $\lambda_1$, $\lambda_2$, $\lambda_3$ traveling in an input optical fiber 40 pass through the GRIN lens 36 and are reflected from the blazed grating 38 and emerge as separate wavelength signals on the optical fibers 42, 44 and 46. Refinement of fabrication techniques have made possible the construction of multiplexer/demultiplexer devices with 3-12 channel capacity. Insertion loss figures are typically $-5$ to $-6$ dB and average adjacent channel optical crosstalk ranges from $-32$ dB (12 channel device) to approximately $-43$ dB (3 channel device). Optical crosstalk may be further reduced by placing the data on alternating channels. The OTDR signal at wavelength $\lambda_3$ is multiplexed in with the bidirectional data signals at wavelengths $\lambda_1$ and $\lambda_2$ without any traffic interruption or interference, thereby providing continuous link monitoring without having to shut down the transmission for the OTDR inspection of the cable plant. The wavelength $\lambda_3$ of the OTDR pulses is selected so as not to create interference with the active data channels operating at wavelengths $\lambda_1$ and $\lambda_2$. Thus, the OTDR signal continuously monitors the status of the cable plant without interfering with the active data channels.

Figure 3:
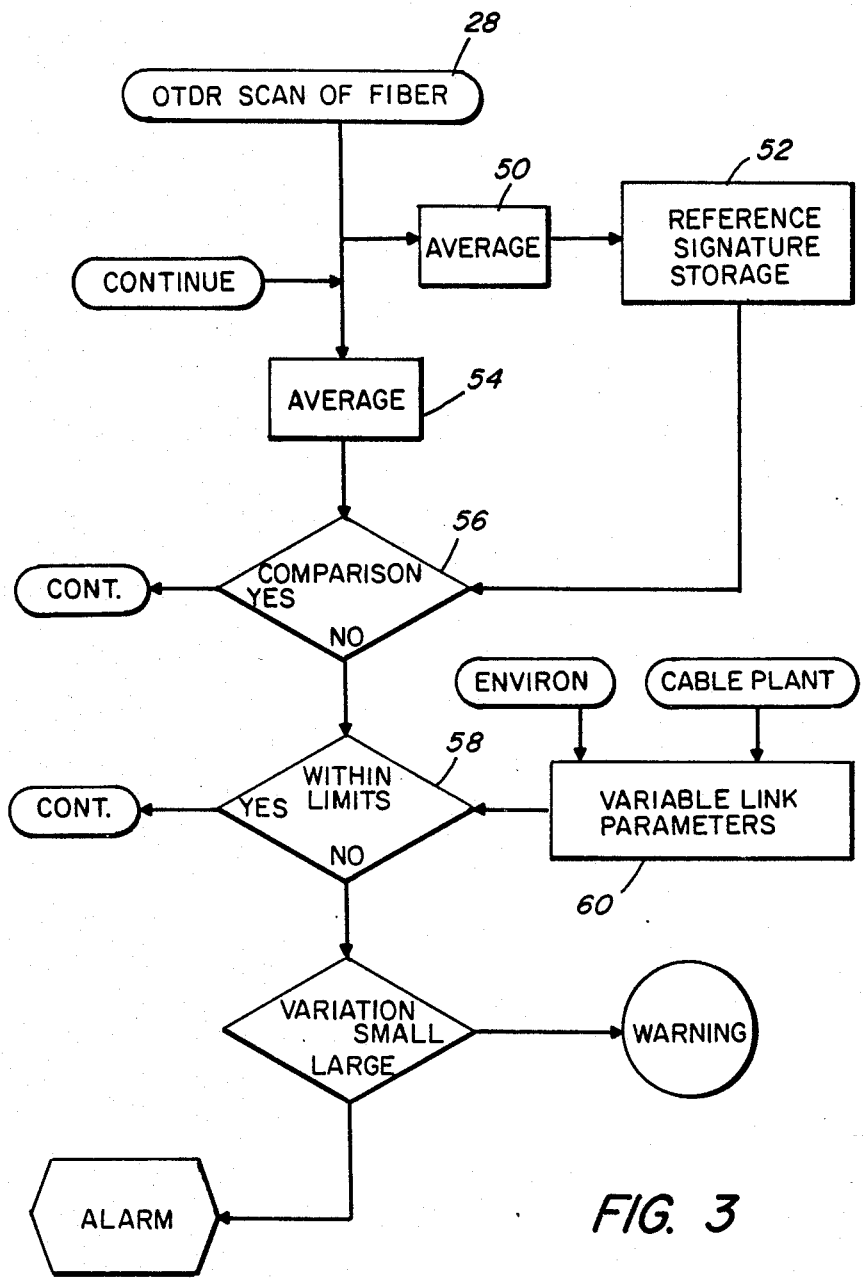
FIG. 3 is a logic flow chart illustrating the microprocessor control used in the present invention.

A notable feature of the present system lies in the fact that it is microprocessor controlled. Since the configuration is "smart", its versatility is greatly enhanced. By intergrating a microprocessor/controller 32 into the system, it is possible to adjust the processing parameters as configuration parameters change within the communications link. The logic flow chart outlining the microprocessor control will now be described in conjunction with FIG. 3. The OTDR 28 scans the optical fiber link 10 and an initial average OTDR signature is determined in an averaging unit 50 and is stored in a reference signature storage unit 52. Subsequently, the link is continuously monitored by the OTDR signal and an average signature is computed in an averaging block 54. A comparison block 56 compares the continuously determined average signature with the reference signature from the reference signature storage unit 52. If the comparison indicates that the monitored data has . not remained within acceptable limits with regard to the reference signature, then the data is further processed by the block 58 and any changes in variable link parameters are factored in from the variable link parameter block 60. Environmental effects such as temperature or equipment instability factors serve as inputs to the variable link parameter block 60. It is preferred that the input of the processing factors be automatic rather than interactive so as not to require a human operator. In the event that the observed perturbation does not fall within acceptable and preselectable limits, a warning or alarm condition is activated. The use of the microprocessor based controller 32 also allows for short and long term "refreshing" of the reference data.

The operational range of the present system is determined by the losses of the optical link and the amount of energy that the OTDR is able to launch through the multiplexer/demultiplexer and into the link fiber. Currently, the maximum commercially available roundtrip backscatter signal measurement at conventional wavelengths is approximately 43 dB. This dynamic range must be considered when determining the effective range of the system. The amount of optical power launched must be sufficient to overcome the loss mechanisms (fiber, connectors, etc.) of the link. The following link budget analyses illustrate system capabilities.

| OTDR EFFECTIVE LINK COVERAGE | |
| --- | --- |
| Cable Loss: | −1.75 dB/km in 1 km assemblies @ 850 nm. |
| Splice Loss: | −0.15 dB |
| MULDEM Loss: | −5 dB |
| Link Budget: | (for 8 km link) |
| MULDEM: | −5 dB |
| Cable: | −1.75 dB × 8 = −14 dB |
| Splices: | −0.15 dB × 8 = −1.2 dB |
| TOTAL: | −20.2 dB |
| OTDR Dynamic Range | 21.5 dB |
| Link Margin | 1.3 dB |

As can be seen, the dynamic range of available OTDR's assures the feasibility of the distances considered. Reduction of cable and connector losses, in addition to operation at longer wavelengths, will allow even greater coverage of tactical configurations. Other techniques presently available allow extended backscatter detection. For example, the use of a photomultiplier tube increases the sensitivity of the receiver while reducing noise. 60 km OTDR ranges using longer (1.32 $\mu$m) wavelengths have been reported. Improvements in couplers can also increase range by providing more available optical power from the OTDR.

Overall, the system configuration is quite straightforward. There are no complicated optics schemes and the electronic design is readily achievable. Standard fiber and cable can be used as well as connectors and common splice techniques. The microprocessor allows for a very versatile system which includes the ability to factor in operational parameter changes and normal link degradation. The OTDR technique of the present invention, because of the microprocessor control, is not only capable of identifying the severity of the perturbation in the cable plant, but also its location by an analysis of the OTDR signature.

It is thus seen that the objects of this invention have been achieved in that there has been disclosed a self-monitoring fiber optic link system for continuously monitoring the status of a fiber optic communications link. The present system utilizes standard components. It is recognized that modifications and variations of the present invention will occur to those skilled in the art and it is intended that all such modifications and variations be included within the scope of the appended claims.

What is claimed is:

1. Apparatus for continuously monitoring a fiber optic communications link comprising:
    apparatus for multiplexing an OTDR signal with at least one data signal on the fiber optic link;
    means for determining an initial average OTDR reference signature for the OTDR signal on the link;
    means for continuously determining an average OTDR signature;
    means for comparing the reference signature with the continuously determined signature; and
    means for generating a warning or alarm signal when the continuously determined signature differs from the reference signature by a preselectable limit.

2. The apparatus of claim 1 further including microprocessor means for adjusting the preselectable limit in response to the communication link operational parameters.

3. The apparatus of claim 2 wherein the adjusting means is responsive to temperature.

4. The apparatus of claim 2 wherein the adjusting means is responsive to equipment instability.

5. The apparatus of claim 1 wherein the multiplexing apparatus is a GRIN lens/blazed grating combination.

6. The apparatus of claim 1 including two data signals at different wavelengths.

* * * * *